United States Patent
Yasuna et al.

(10) Patent No.: US 11,830,524 B1
(45) Date of Patent: Nov. 28, 2023

(54) DATA STORAGE DEVICE WITH SPLIT BURST SERVO PATTERN

(71) Applicant: WESTERN DIGITAL TECHNOLOGIES, INC., San Jose, CA (US)

(72) Inventors: Kei Yasuna, Kanagawa (JP); Guoxiao Guo, Irvine, CA (US); Ichiro Yokokawa, Kanagawa (JP)

(73) Assignee: WESTERN DIGITAL TECHNOLOGIES, INC, San Jose, CA (US)

( * ) Notice: Subject to any disclaimer, the term of this patent is extended or adjusted under 35 U.S.C. 154(b) by 0 days.

(21) Appl. No.: 17/839,011

(22) Filed: Jun. 13, 2022

(51) Int. Cl.
  *G11B 5/596* (2006.01)
  *G11B 5/54* (2006.01)
  *G11B 21/08* (2006.01)

(52) U.S. Cl.
  CPC .................. *G11B 21/08* (2013.01)

(58) Field of Classification Search
  CPC .... G11B 5/54; G11B 5/00; G11B 5/09; G11B 20/12; G11B 5/56; G11B 5/58; G11B 5/59688
  USPC .................. 360/75, 77.01, 77.05
  See application file for complete search history.

(56) References Cited

U.S. PATENT DOCUMENTS

| | | |
|---|---|---|
| 5,793,559 A | 8/1998 | Shepherd et al. |
| 6,324,030 B1 | 11/2001 | Cheung |
| 6,977,792 B1 | 12/2005 | Melrose |
| 7,576,942 B1 | 8/2009 | Karns et al. |
| 7,619,841 B1 | 11/2009 | Kupferman |
| 8,355,300 B2 | 1/2013 | Grobis |
| 8,767,327 B1 | 7/2014 | Saito et al. |
| 9,053,728 B1 | 6/2015 | French, Jr. |

(Continued)

FOREIGN PATENT DOCUMENTS

| | | | | |
|---|---|---|---|---|
| JP | 2001014816 | * | 1/2001 | ............... G11B 5/54 |
| JP | 2012079402 A | | 4/2012 | |
| WO | 1997032301 A1 | | 9/1997 | |

OTHER PUBLICATIONS

Ma Kun; Servo Pattern Enhancements for High Areal Density Hard Disk Drives; School of Electrical & Electronic Engineering A thesis submitted to the Nanyang Technological University in partial fullment of the requirements for the degree of Doctor of Philosophy 2017; 178 pages https://dr.ntu.edu.sg/bitstream/10356/72656/1/SERVO%20PATTERN%20ENHANCEMENTS%20FOR%20HIGH%20AREAL%20DENSITY%20HARD%20DISK%20DRIVES.pdf.

(Continued)

*Primary Examiner* — Nabil Z Hindi
(74) *Attorney, Agent, or Firm* — Calderon Safran & Cole P.C

(57) ABSTRACT

Various illustrative aspects are directed to a data storage device, comprising: one or more disks; an actuating mechanism comprising one or more heads, and configured to position the one or more heads proximate to disk surfaces of the one or more disks; and one or more processing devices. The one or more processing devices are configured to: determine a first burst value based on an averaged value of a first set of one or more bursts; determine a second burst value based on an averaged value of a second set of one or more bursts; generate a position error signal (PES) based on the determined first burst value and the determined second burst value; and control a position of at least one head among the one or more heads based on the PES.

20 Claims, 10 Drawing Sheets

(56) References Cited

U.S. PATENT DOCUMENTS

| | | |
|---|---|---|
| 9,384,774 B1 | 7/2016 | Nookala et al. |
| 9,626,989 B1 | 4/2017 | Buch et al. |
| 9,972,344 B2 | 5/2018 | Ruan et al. |
| 10,997,997 B1 | 5/2021 | Xiong |
| 11,200,912 B1 | 12/2021 | Guo et al. |
| 2005/0128634 A1 | 6/2005 | Schmidt |
| 2006/0215306 A1 | 9/2006 | Ehrlich et al. |
| 2007/0002487 A1 | 1/2007 | Langlois et al. |

OTHER PUBLICATIONS

Guo et al.; Servo detection and control considering servo pattern defects; Conference Paper • Jan. 2012; ResearchGate; 3 pages.
International Search Report & Written Opinion from related International Application No. PCT/US2023/021398 dated Aug. 22, 2023, 9 pages.

\* cited by examiner

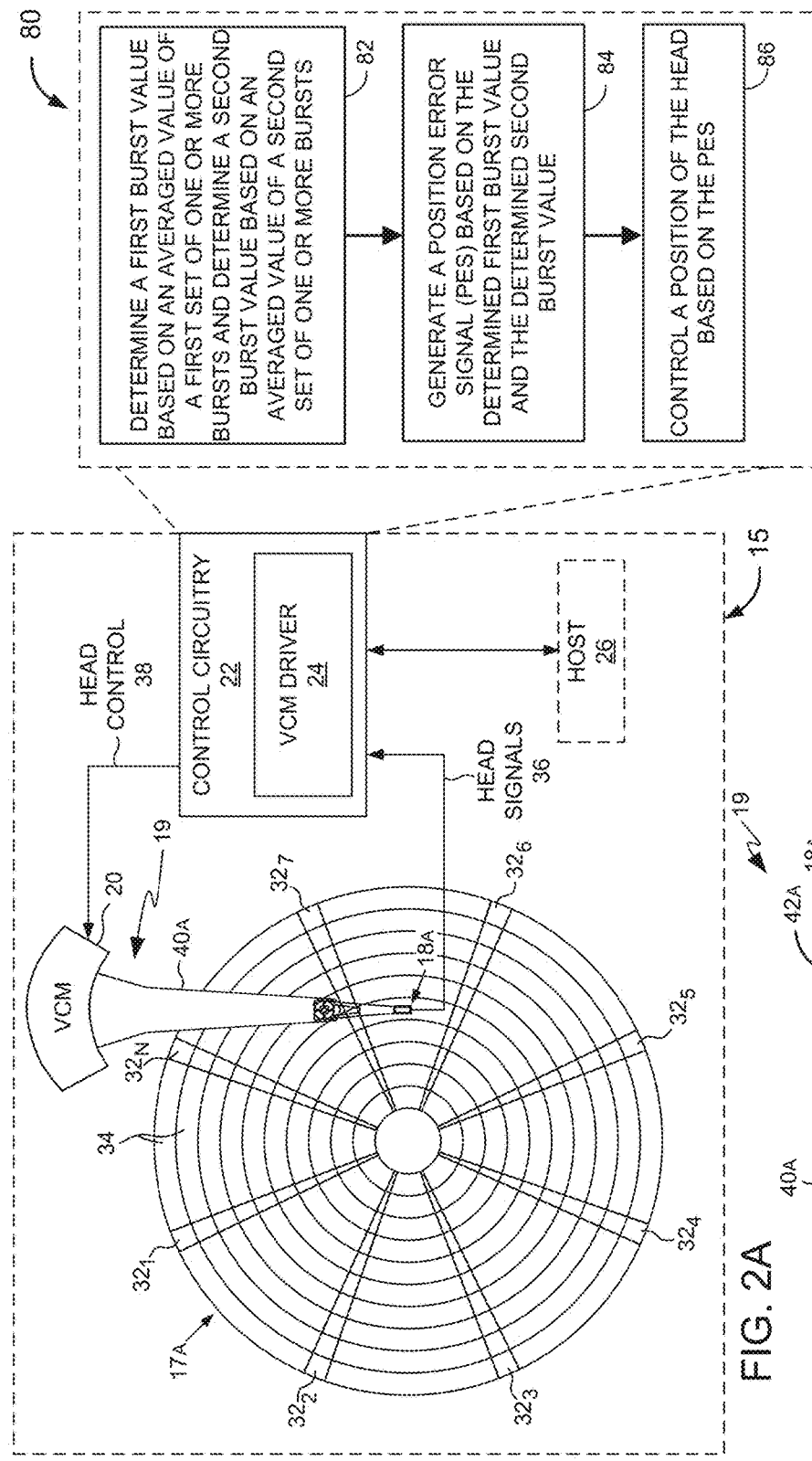
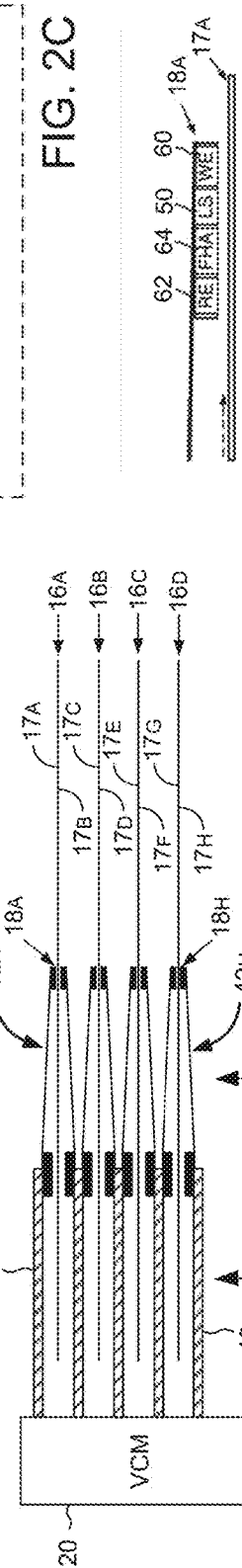

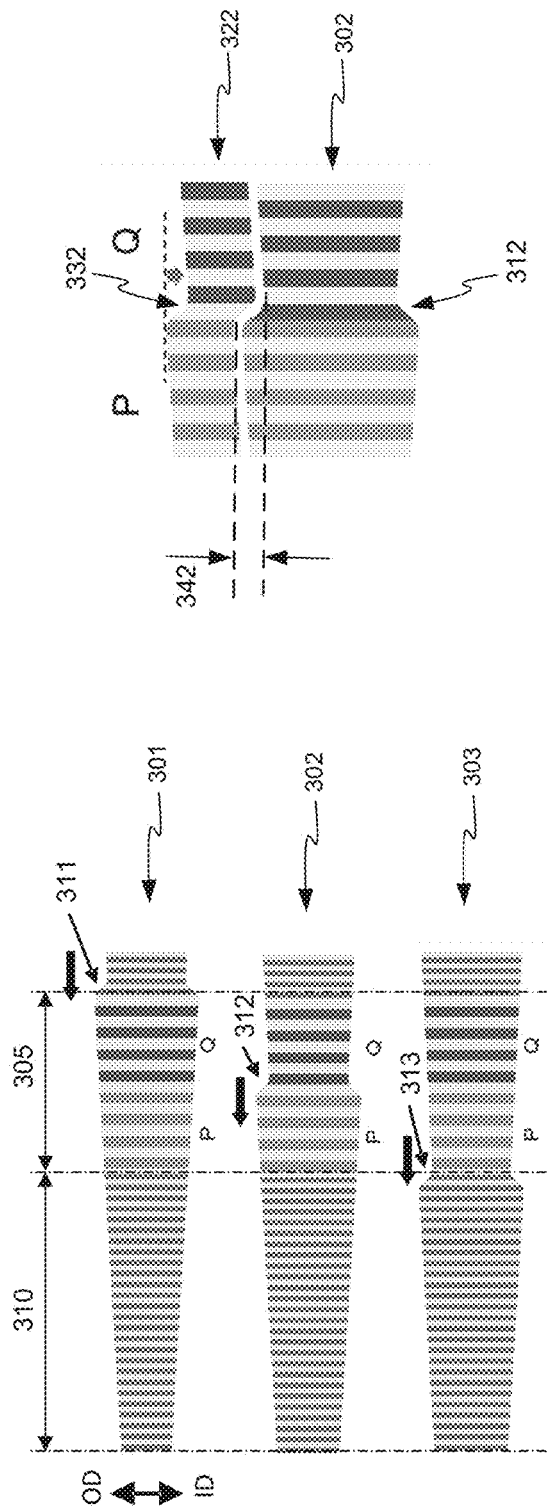
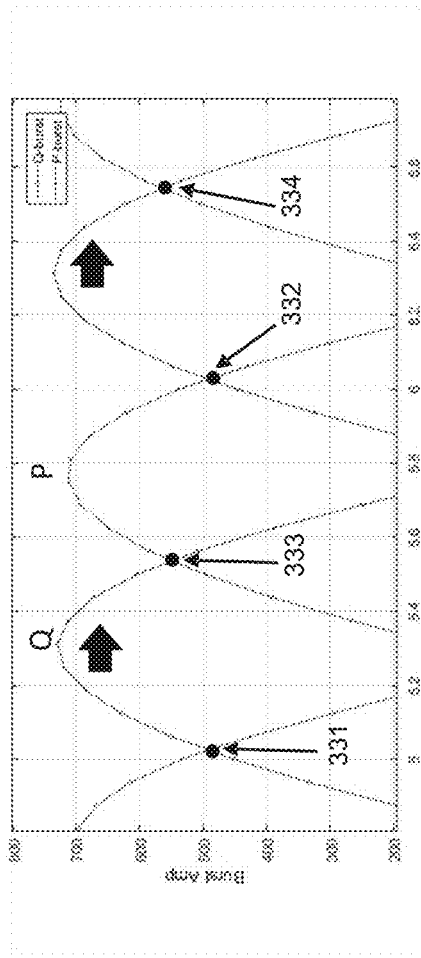
FIG. 3A
FIG. 3B
FIG. 3C

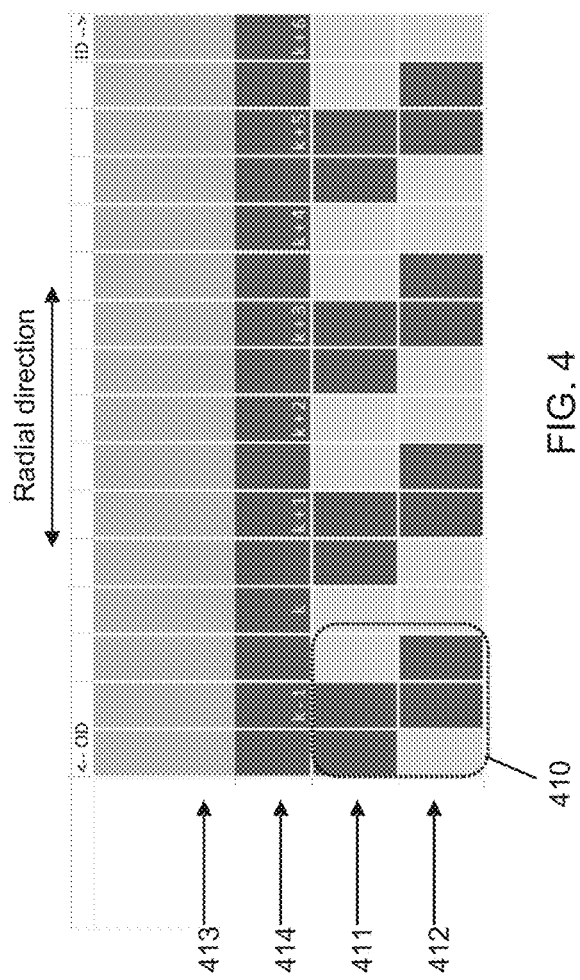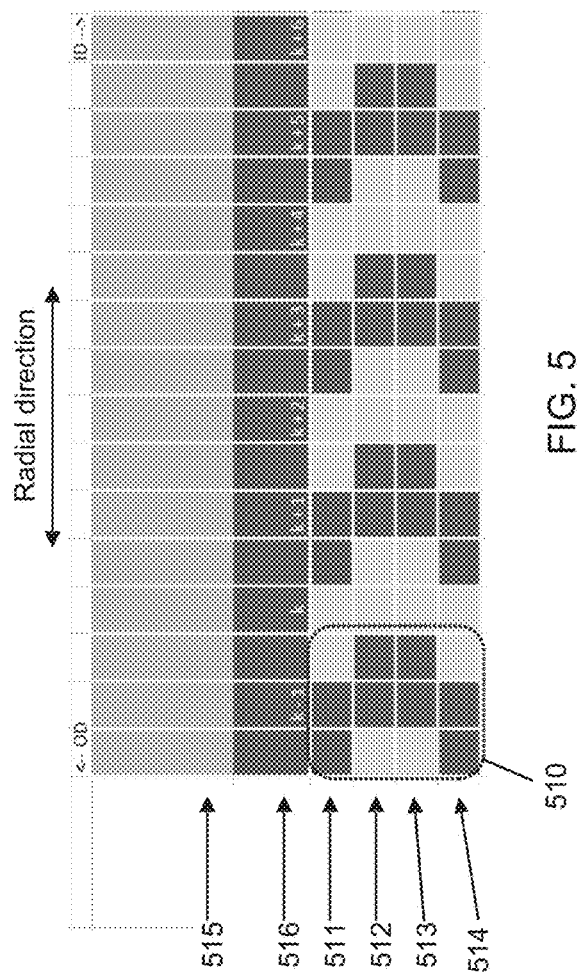

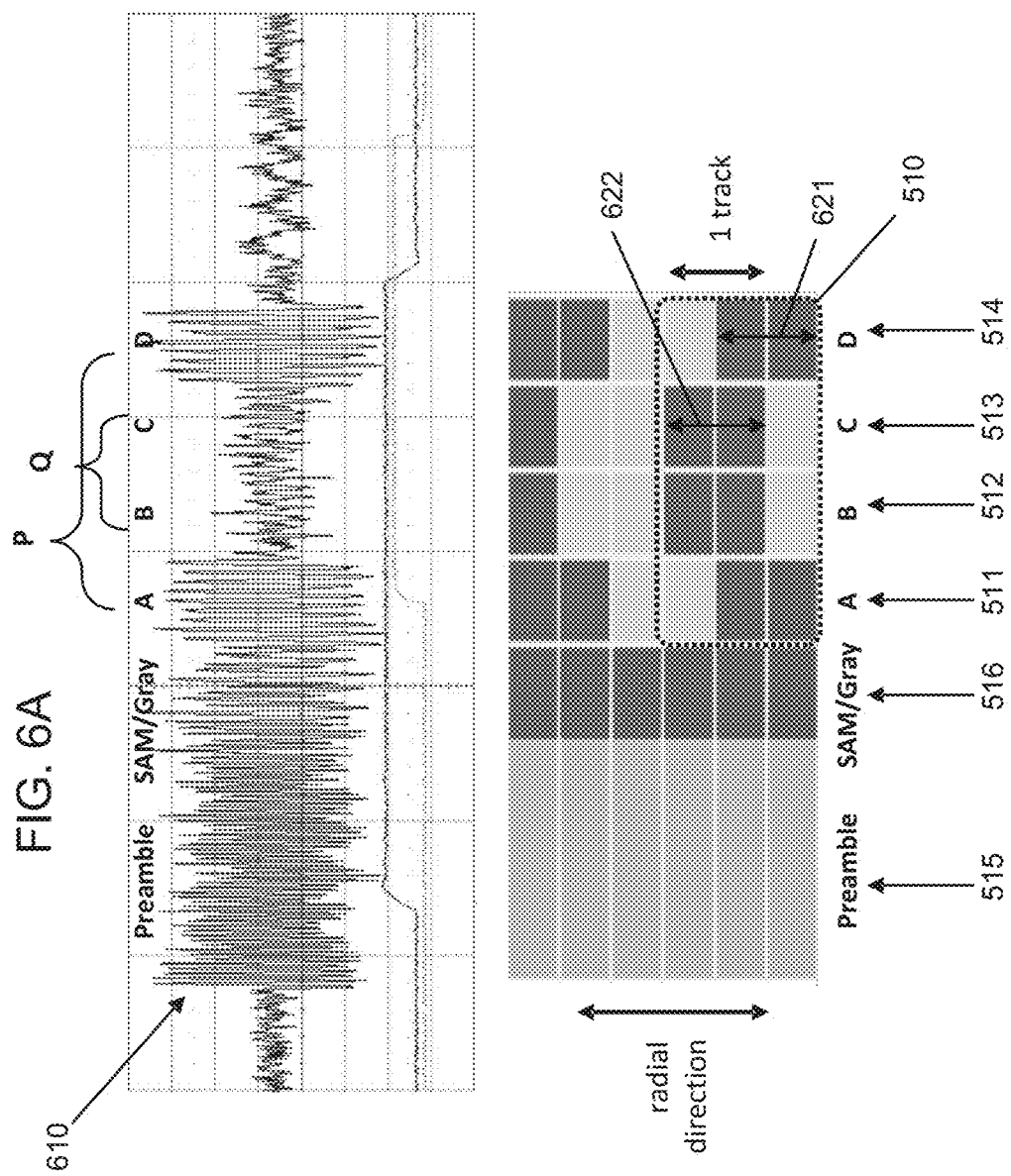

DATA STORAGE DEVICE WITH SPLIT BURST SERVO PATTERN

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., P and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine actuators, in a dual stage actuator or a triple stage actuator, in some examples.

Data is typically written to the disk by modulating a write current in an inductive coil (write coil) to record magnetic transitions onto the disk surface in a process referred to as saturation recording. During read-back, the magnetic transitions are sensed by a read element (e.g., a magneto-resistive element) and the resulting read signal demodulated by a suitable read channel. Heat assisted magnetic recording (HAMR) is a recent development that improves the quality of written data by heating the disk surface during write operations in order to decrease the coercivity of the magnetic medium, thereby enabling the magnetic field generated by the write coil to more readily magnetize the disk surface. Any suitable technique may be employed to heat the surface of the disk in HAMR recording, such as by fabricating a laser diode and a near field transducer (NFT) with other write components of the head. Since the quality of the write/read signal depends on the fly height of the head, conventional heads may also comprise an actuator for controlling the fly height. Any suitable fly height actuator (FHA) may be employed, such as a heater which controls fly height through thermal expansion, or a piezoelectric (PZT) actuator that actuates through mechanical deflection.

SUMMARY

Various examples disclosed herein are directed to systems and methods that mitigate the impact of servo pattern distortion caused by laser mode hopping that occurs with the use of HAMR laser systems in hard disk drives. Implementations of the present disclosure may use a split burst servo pattern that includes first and second sets of bursts. In various examples, the disk drive control circuitry generates a position error signal (PES) based on averaged values from the first and second sets of bursts. Averaging the values from plural spaced apart bursts helps cancel out a step change that can occur due to mode hopping. In this manner, implementations help reduce the occurrence of DC squeeze that can result from servo pattern distortion caused by laser mode hopping.

Various illustrative aspects are directed to a data storage device, comprising: one or more disks; an actuating mechanism comprising one or more heads, and configured to position the one or more heads proximate to disk surfaces of the one or more disks; and one or more processing devices. The one or more processing devices are configured to: determine a first burst value based on an averaged value of a first set of one or more bursts; determine a second burst value based on an averaged value of a second set of one or more bursts; generate a position error signal (PES) based on the determined first burst value and the determined second burst value; and control a position of at least one head among the one or more heads based on the PES.

Various illustrative aspects are directed to a method. The method comprises determining, by one or more processing devices, a first burst value based on an averaged value of a first set of one or more bursts; determining, by the one or more processing devices, a second burst value based on an averaged value of a second set of one or more bursts; generating, by the one or more processing devices, a position error signal (PES) based on the determined first burst value and the determined second burst value; and controlling, by the one or more processing devices, a position of a head of a data storage device based on the PES.

Various illustrative aspects are directed to a one or more processing devices. The one or more processing devices comprise: means for determining a first burst value based on an averaged value of a first set of one or more bursts; means for determining a second burst value based on an averaged value of a second set of one or more bursts; means for determining generating a position error signal (PES) based on the determined first burst value and the determined second burst value; and means for controlling a position of a head of a disk drive based on the PES.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

FIGS. 2A and 2B illustrate conceptual block diagrams of a top view and a side view of a data storage device in the form of a disk drive, in accordance with aspects of the present disclosure.

FIG. 2C depicts a flowchart for an example method that one or more VCM drivers of control circuitry of a disk drive may perform or execute in controlling the operations of the disk drive, including the operations of head position adjustment, in accordance with aspects of the present disclosure.

FIG. 2D depicts a read/write head including a laser unit, in accordance with aspects of the present disclosure.

FIGS. 3A-3C depict the mechanism of DC bi-modal distortion caused by laser mode hopping.

FIG. 4 shows a conventional null burst servo pattern that includes a first burst and a second burst.

FIG. 5 shows a split null burst servo pattern in accordance with aspects of the present disclosure.

FIGS. 6A and 6B show the split null burst servo pattern relative to a readback waveform in accordance with aspects of the present disclosure.

DETAILED DESCRIPTION

Figure 1:
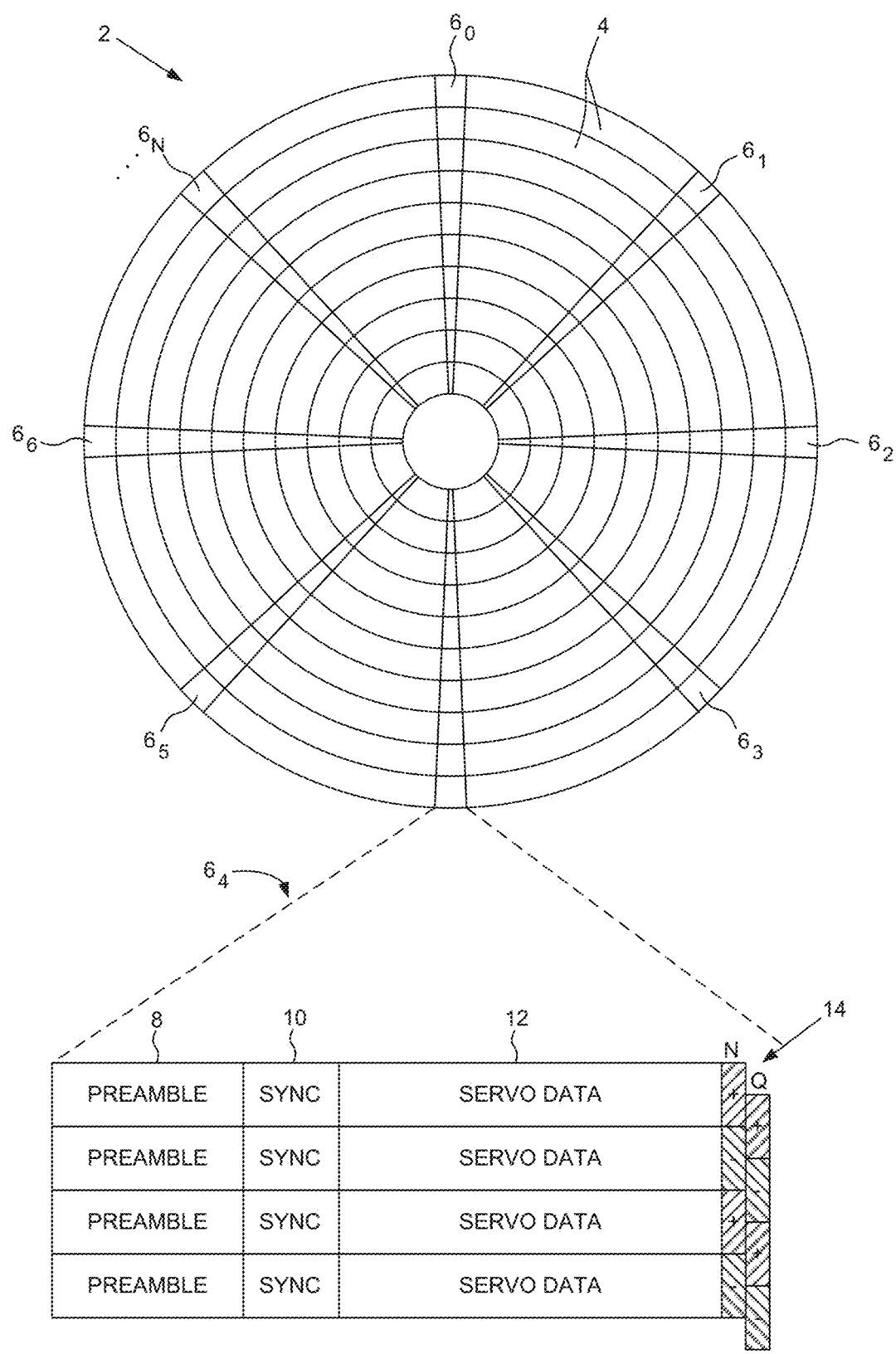
FIG. 1 shows a prior art disk format as comprising a number of radially-spaced, concentric servo tracks defined by servo wedges recorded around the circumference of each servo track.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). FIG. 2C depicts a flowchart for an example method 80 that one or more VCM drivers 24 of control circuitry 22 of disk drive 15 may perform or execute in controlling the operations of disk drive 15, including the operations of head position adjustment in accordance with aspects of the present disclosure.

Actuator arm assembly 19 comprises a primary actuator, e.g., a voice coil motor 20 ("VCM 20") and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more auxiliary actuators or fine actuators, in some examples.

Each of actuator arms 40 is configured to suspend a read/write head 18 in close proximity over a corresponding disk surface 17 (e.g., read/write head 18A suspended by topmost actuator arm 40A over topmost corresponding disk surface 17A, read/write head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one actuator in the form of VCM 20 in the example of FIGS. 2A and 2B, for example.

In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples.

Control circuitry 22 may comprise one or more processing devices that constitute device drivers, specially configured for driving and operating certain devices. Such device drivers may comprise one or more VCM drivers 24, configured for driving and operating VCM 20. VCM drivers 24 may be configured as integrated components of one or more larger-scale circuits, such as one or more power large-scale integrated circuit (PLSI) chips or circuits, and/or as part of control circuitry 22, in various examples. VCM drivers 24 may also be configured as components in other large-scale integrated circuits such as system on chip (SoC) circuits, or as more or less stand-alone circuits, which may be operably coupled to other components of control circuitry 22, in various examples.

Example disk drive 15 of FIGS. 2A and 2B comprises four hard disks 16. Other examples may comprise any number of disks, such as one disk, two disks, three disks, or five or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. VCM 20 may perform primary, macroscopic actuation of a plurality of actuator arms 40, each of which may suspend one of heads 18, e.g., head 18A, over and proximate to corresponding disk surfaces of disks 16. The position of heads 18, e.g., head 18A, are indicated in FIG. 2A, and are generally positioned very close to disk surfaces 17, although heads 18 are too small to be visible if depicted to scale in FIGS. 2A and 2B. Actuator arm assembly 19 suspends each of heads 18 of each actuator arm 40 over and proximate to a corresponding disk surface 17, enabling each head 18 to write control features and data to, and read control features and data from, its respective, proximate disk surface 17. In this sense, each head 18 of each actuator arm 40 interacts with a corresponding disk surface 17. Each head 18 writes to and reads from its corresponding disk surface 17 under the positioning control of the actuators of actuator arm assembly 19, comprising VCM 20, in this example, and potentially additional fine actuators, which may be controlled by control circuitry 22, in various examples.

FIG. 2D depicts an expanded view of head 18A including a laser unit 50 in a HAMR system, in accordance with aspects of the present disclosure. In the embodiment of FIG. 2D, head 18A comprises a laser unit 50 configured to heat the disk surface, a write element 60 (e.g., an inductive coil), a read element 62 (e.g., a magnetoresistive element), and a fly height actuator (FHA) 64 configured to actuate head 18A vertically over disk surface 17A. Any suitable FHA 64 may be employed, such as a thermal fly height control (TFC) element that actuates through thermal expansion, or a piezoelectric actuator that actuates through mechanical deflection. Head 18A may also comprise other optical components associated with laser unit 50, such as a waveguide and a near field transducer (NFT) configured to use a laser emitted by laser unit 50 to project a plasmon onto disk surface 17A to heat an area of disk surface 17A to be written to with write element 60. The arrangement or disposition of elements of heads 18 described herein is not limited to any specific detail as shown in FIG. 2D, and the elements of head 18 may be arranged in any of a variety of other configurations in other examples.

The term "disk surface" may be understood to have the ordinary meaning it has to persons skilled in the applicable engineering fields of art. The term "disk surface" may be understood to comprise both the very outer surface layer of a disk drive as well as a volume of disk drive matter beneath the outer surface layer, which may be considered in terms of atomic depth, or (in a greatly simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A, 2B, and 2D, each disk surface 17, e.g., disk surface 17A as shown in FIG. 2A, comprises a plurality of control features. The control features comprise servo wedges $32_1$-$32_N$ (collectively, servo wedges 32), which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate servo wedges $32_1$-$32_N$ and generate a position error signal (PES) representing an error between the actual position of the head and a target position relative to a target track. A servo control system in control circuitry 22 filters the PES from the servo wedges using a suitable compensation filter to generate a control signal 38 applied to actuator arm assembly 19, including to control VCM 20, which rotates actuator arm assembly 19 about an axial pivot in order to perform primary actuation of the corresponding heads 18 radially over the disk surfaces 17 in a direction that reduces the PES, as well as to control any fine actuators, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. Other examples may employ more than two actuator arm assemblies or primary actuators or multi-actuators, which may be actuated about a common pivot, or which may be comprised in multiple multi-actuators mounted at different circumferential locations about the disks. These may all be examples of an actuating mechanism comprising one or more heads 18, and configured to position the one or more heads 18 proximate to disk surfaces 17 of the one or more disks 16, in accordance with various examples of this disclosure.

In executing example method 80 of FIG. 2C (aspects of which will also be further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15. In particular, control circuitry 22 may determine a first burst value based on an averaged value of a first set of one or more bursts, and determine a second burst value based on an averaged value of a second set of one or more bursts (82). Control circuitry 22 may further generate a position error signal (PES) based on the determined first burst value and the determined second burst value (84). Control circuitry 22 may further control a position of the head based on the PES (86).

Referring again to head 18A of a HAMR disk drive as shown in FIG. 2D, when control circuitry 22 is applying current (or power in any form) to laser unit 50 during write operations, laser unit 50 may exhibit sudden and unpredictable changes in which of two or more available modes in which it emits a laser, due to the inherent physics of laser emission, which cause transients, or sudden shifts in magnitude, in output power of the laser being emitted by laser unit 50. This phenomenon is known as "mode hopping." Because such laser mode hopping can create sudden, unpredictable changes in the laser power, laser mode hopping may also cause sudden, unpredictable write width changes, even while the write current applied to write element 60 remains constant. That is, a greater or lesser width across disk surface 17 may be susceptible to the constant write current in response to the laser suddenly becoming more or less powerful, respectively. When such changes in write width are applied to servo control features, laser mode hopping may therefore cause distortion of servo patterns in a servo wedge 32. Such distortion of the servo patterns may be referred to as DC bi-modal distortion, or simply as "DC bi-modal," and may result in degraded operational issues of disk drive 15 such as DC squeeze (also called track squeeze) and/or large repeatable runout (RRO) error. Laser mode hopping is thus an undesirable characteristic of HAMR systems and has proven difficult to eliminate. Accordingly, aspects of the present disclosure are directed to systems and methods that mitigate the impact of servo pattern distortion caused by laser mode hopping, among other advantages.

FIGS. 3A-3C depict illustrative examples of the mechanism of DC bi-modal distortion caused by laser mode hopping. FIG. 3A depicts examples of elemental writing pattern generated at a servo writing process. Elemental servo wedge patterns 301, 302, 303 illustrate three example cases that each has write width change while writing a single servo wedge. Each of elemental servo wedge patterns 301, 302, 303 comprises a block 310 and a block 305. Block 310 in each of elemental servo wedge patterns 301, 302, 303 is comprised of preamble, servo address mark (SAM) or servo index mark (SIM), and Gray coded track information. Block 305 in each of elemental servo wedge patterns 301, 302, 303 comprises a Q burst and a P burst. In the servo writing process, control circuitry 22 may write elemental servo wedge pattern 302 overlapped with a previous elemental servo wedge pattern 322 by adding a half-track radial offset, as shown in FIG. 3B. Control circuitry 22 may iterate this write and move operation to form a servo wedge, e.g., servo wedges 32 in FIG. 2A, across the stroke on a disk surface 17.

FIG. 3A depicts sudden, unpredicted write width change patterns 311, 312, 313 caused by laser mode hop as described herein, in elemental servo wedge patterns 301, 302, 303, respectively. The slowly increasing trend over time (i.e. left to right) of write width of elemental servo wedge patterns 301, 302, 303 is attributed to regular write transient due to ramp-up of laser power. The occurrence of the mode hop-induced write width change is not completely random when writing servo wedges. In most cases, the write width changes like write width change patterns 311, 312, 313 show up at almost the same down track location of every wedge while writing a few thousands of tracks. As the process goes further over time and as servo writing proceeds radially across disk surface 17A, the down track location of write width change pattern 311 may gradually shift to the locations of write width change patterns 312 and/or 313. As a null burst pattern is formed by stitching polarity flipped patterns, a case when the write width change overlaps the burst area as shown in elemental servo wedge pattern 302 and write width change pattern 312 has greater impact on servo positioning operation of disk drive 15, relative to cases in which a write width change lies outside of the burst area, as in write width change patterns 311 and 313.

FIG. 3B shows a magnified view of the distortion of the Q burst and the P burst caused by the write width change pattern 312 overlapping the null burst servo pattern of elemental servo wedge pattern 302 as shown in FIG. 3A, which is subsequently written adjacent to and partially overlapping elemental servo wedge pattern 322 having a similarly distorted write width change pattern 332 between that track's Q burst and P burst. As shown in FIG. 3B, when write width change patterns 312, 332 overlap the null burst servo patterns, a burst transition edge may be consistently radially shifted relative to adjacent null burst servo patterns in adjacent elemental servo wedge patterns 302, 322. In the example shown in FIG. 3B, the P and Q bursts are radially shifted by the distortion caused by write width changes such as write width change patterns 312 or 332. As a result, the pattern edges of the P burst and the Q burst are shifted from each other, creating the radial location difference 342. While null bursts are used in this example, control circuitry 22 may also write quad bursts, in various examples. In the quad burst cases, control circuitry 22 may write a pair of single-sided bursts that are radially placed with 180 degree offset and provide an equivalent functionality of one null burst. Consequently, any null burst example of this disclosure can also be realized by replacing a single null burst with a pair of single-sided bursts. Thus, in some examples, a first set of one or more bursts and a second set of one or more bursts may comprise null bursts, which are formed by iteratively writing a single frequency pattern with its pattern phase changed 180 degrees at each track of a plurality of tracks; and in some examples, a first set of one or more bursts and a second set of one or more bursts may comprise quad bursts, which comprise pairs of single-sided bursts formed by writing a single frequency pattern at every other track, wherein the single-sided bursts are placed with a one-track-wide radial offset from one of the single-sided bursts to another.

FIG. 3C shows an exemplary cross track profile of servo burst signals of the Q burst and the P burst that result from the distortion of the null burst servo patterns as depicted in FIG. 3B. In the example shown in FIG. 3C, the Q burst edge is placed on the inner diameter (ID) side relative to the P burst edge by the shift amount 342. As shown in FIG. 3C, due to the radially shifted profile of one burst relative to the other burst, the amplitude of the crossing levels 331, 332 at the integer locations differs from the amplitude of the crossing levels 333, 334 at the half-integer locations. This cross-point split (also referred to as DC bi-modal herein) leads to distortion of fractional servo pattern track position scale, and undesirable DC track misregistration.

FIG. 4 shows a set of adjacent servo tracks comprising a conventional null burst servo pattern 410, comprising an example set of servo bursts of three adjacent tracks, as a basis of comparison for FIG. 5 and subsequent figures, and that includes a first set of servo bursts 411 and a second set of servo bursts 412. The null burst servo pattern 410 may be included in a servo wedge of a servo track of a disk, and the servo wedge may additionally include preambles 413 and other servo information 414 such as servo index marks (SIM) or servo address marks (SAM), and Gray coded track address representing the address of the corresponding servo track. The first set of bursts 411 may correspond to the P bursts shown in FIGS. 3A-3C, and the second set of bursts 412 may correspond to the Q bursts shown in FIGS. 3A-C. In this configuration, the system may be susceptible to undesirable impaired servo sensing, track misregistration, and DC bi-modal that results from distortion of the null burst servo pattern 410 as a result of laser mode hopping, e.g., as described with respect to FIGS. 3A-3C.

FIG. 5 shows a set of adjacent servo tracks comprising a split null burst servo pattern 510, comprising an example set of servo bursts of adjacent tracks, in accordance with aspects of the present disclosure. In various embodiments, the split null burst servo pattern 510 includes a first burst 511, second burst 512, third burst 513, and fourth burst 514. The split null burst servo pattern 510 may be included in a servo wedge 32 of a servo track 34 of a disk 16 such as that shown in FIG. 2A, and the servo wedge 32 may additionally include a set of preambles 515 and other servo information 516 such as a set of servo index marks (SIM) or servo address marks (SAM), and Gray coded track address representing the address of the corresponding servo track.

In embodiments, control circuitry 22 may write the first burst 511 and the fourth burst 514 with one same pattern polarity, and the second burst 512 and the third burst 513 with another same pattern polarity by updating their polarity so the first and fourth combination and the second and third combination are at a substantially 90 degree offset (e.g., within nominal engineering tolerances of a 90 degree offset) relative to the first radial location. In this example, the first burst 511 and the fourth burst 514 constitute a first set of null bursts, and the second burst 512 and the third burst 513 constitute a second set of null bursts. According to aspects of the present disclosure, in demodulating the split null burst servo pattern 510, control circuitry 22 may determine an averaged value of the first burst 511 and the fourth burst 514 amplitudes as one burst value (e.g., the P burst value) and an averaged value of the second burst 512 and the third burst 513 amplitudes as another burst value (e.g., the Q burst value). In this manner, control circuitry 22 may sample the split null burst servo pattern 510 from multiple down-track locations, which may result in the P burst and Q burst values being derived as averaged values, which may help to cancel out effects of unpredicted write width changes that may cause distortion of the servo pattern.

FIGS. 6A and 6B show the split null burst servo pattern 510 relative to a readback waveform 610 generated by reading the preamble 515, other servo information 516, and burst patterns 511-514, in accordance with illustrative aspects of this disclosure. As shown in FIGS. 6A and 6B, the split null burst servo pattern 510 includes four bursts across three adjacent servo tracks comprising radially aligned burst pair 511, 514 and radially aligned burst pair 512, 513. In accordance with aspects of the present disclosure, when demodulating the split null burst servo pattern 510, control circuitry 22 determines a P magnitude by averaging amplitude values from the first burst pair 511, 514, and control circuitry 22 determines a Q magnitude by averaging amplitude values from the second burst pair 512, 513 (e.g., as at 82 in method 80 of FIG. 2C). After determining the P magnitude and Q magnitude in this manner, control circuitry 22 may then derive the PES in a conventional manner using the determined P magnitude and Q magnitude (e.g., as at 84 in method 80 of FIG. 2C). After determining the PES in this manner, control circuitry 22 may then control the position of the head based on the PES (e.g., as at step 86 in method 80 of FIG. 2C).

In various embodiments, the second burst 512 and third burst 513 are between the first burst 511 and the fourth burst 514 in the longitudinal (e.g., circumferential) direction of the tracks. In this manner, the first burst 511 and the fourth burst 514 are spaced apart from one another along the longitudinal direction of the track, and this spacing combined with the averaging described herein helps mitigate the effect of the sudden, unpredicted write width change that causes distortion of the servo pattern.

With continued reference to FIGS. 5 and 6, the split null burst servo pattern 510 differs from a conventional burst pattern that includes an A burst, B burst, C burst, and D burst because the four A-D bursts in the conventional burst pattern are located at four different radial locations. In contrast to such a conventional burst pattern, the split null burst servo pattern 510 shown in FIGS. 5 and 6 includes two bursts (e.g., bursts 511 and 514) at a same first radial location 621 and two bursts (e.g., bursts 513 and 513) at a same second radial location 622 that is different than the first radial location 621. Writing two bursts at a same first radial location and two bursts at a same second radial location provides for averaging of the burst signal values, as described herein, for the purpose of mitigating the effects of distortion of the servo pattern caused by sudden write width change resulting from laser mode hop.

Figure 7C:
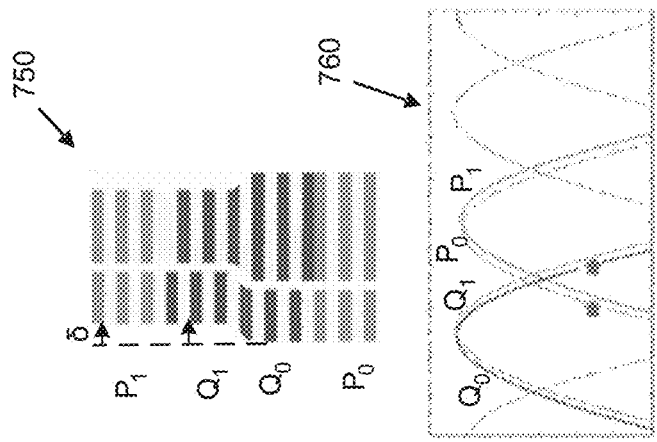
FIGS. 7A-7C depict how the split null burst servo pattern in accordance with aspects of the present disclosure mitigates the effects of distortion of the servo pattern compared to a conventional null burst servo pattern.
Figure 7B:
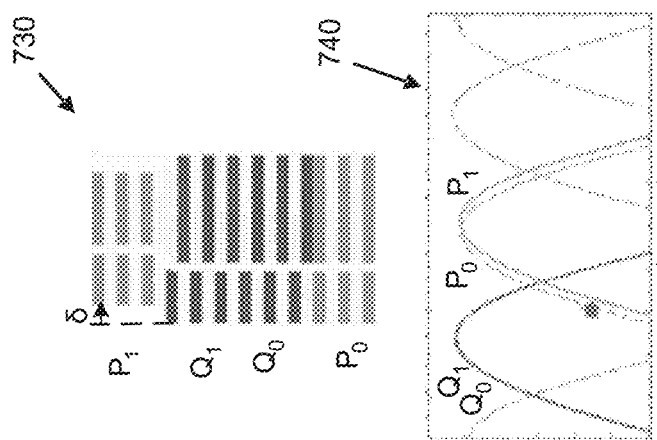
Figure 7A:
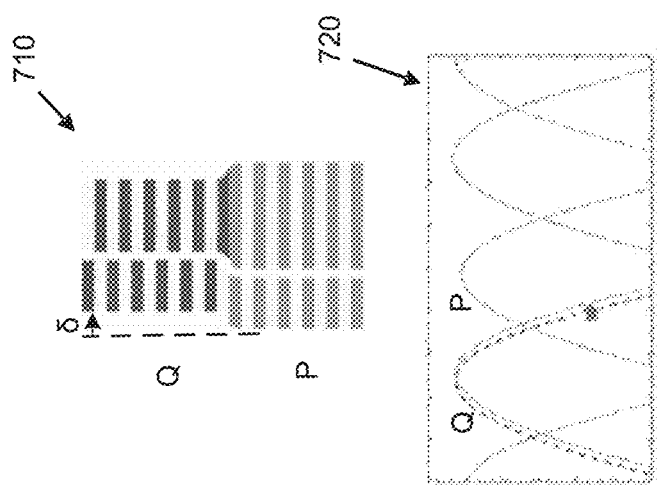

FIGS. 7A-7C depict how the split null burst servo pattern in accordance with aspects of the present disclosure mitigates the effects of distortion of the servo pattern compared to a conventional null burst servo pattern. In this example, the mode hope impact to the servo DC scale is quantified as the relative shift of the P burst and the Q burst, indicated by $\Delta PQ$.

FIG. 7A depicts a diagram of a conventional null burst servo pattern 710 consisting of a P burst and a Q burst (e.g., similar to FIG. 4), in which the Q burst is experiencing distortion (e.g., edge shifting) due to sudden write width change resulting from laser mode hop. As shown in FIG. 7A, the distortion results in an edge shift indicated by $\delta$ (equivalent with radial location shift 342 in FIG. 3B). FIG. 7A also shows a graph 720 of the reading of the P burst and a Q burst, with the Q burst cross track profile shifted to the right due to the edge shift $\delta$. In this example of the conventional null burst servo pattern, $\Delta PQ$ is quantified as $\delta$.

FIG. 7B depicts a diagram of a split null burst servo pattern 730 in accordance with aspects of the present disclosure, the split null burst servo pattern consisting of first burst P0, second burst Q0, third burst Q1, and fourth burst P1. The split null burst servo pattern shown in FIG. 7B may be equivalent to the split null burst servo pattern 510, with burst P0 corresponding to first burst 511, burst Q0 corresponding to second burst 512, burst Q1 corresponding to third burst 513, and burst P1 corresponding to fourth burst 514. In the example shown in FIG. 7B, the sudden write width change is at a position that causes a burst edge shift of magnitude $\delta$ at the burst P1. FIG. 7B also shows a graph 740 of the reading of the first burst P0, second burst Q0, third burst Q1, and fourth burst P1, with the P1 cross track profile shifted to the right relative to the P0 cross track profile due to the edge shift $\delta$, while the Q0 and Q1 cross track profiles are identical. In this example, $\Delta PQ$ is quantified as $\delta/2$, which constitutes a 50% reduction of the effect of the mode hop impact relative to the conventional null burst servo pattern depicted in FIG. 7A.

FIG. 7C depicts a diagram of 750 of a split null burst servo pattern in accordance with aspects of the present disclosure, the split null burst servo pattern consisting of first burst P0, second burst Q0, third burst Q1, and fourth burst P1. The split null burst servo pattern shown in FIG. 7C may be equivalent to the split null burst servo pattern 510, with burst P0 corresponding to first burst 511, burst Q0 corresponding to second burst 512, burst Q1 corresponding to third burst 513, and burst P1 corresponding to fourth burst 514. In the example shown in FIG. 7C, the sudden write width change is at a position that causes a burst edge shift of magnitude $\delta$ at burst P1 and burst Q1. FIG. 7C also shows a graph 760 of the reading of the first burst P0, second burst Q0, third burst Q1, and fourth burst P1, with the P1 and Q1 cross track profiles shifted to the right relative to the P0 and Q0 cross track profiles due to the edge shift $\delta$. In this example, $\Delta PQ$ is quantified as 0, which constitutes a 100% reduction, i.e. a complete elimination, of the effect of the mode hop impact relative to the conventional null burst servo pattern depicted in FIG. 7A.

Figure 8B:
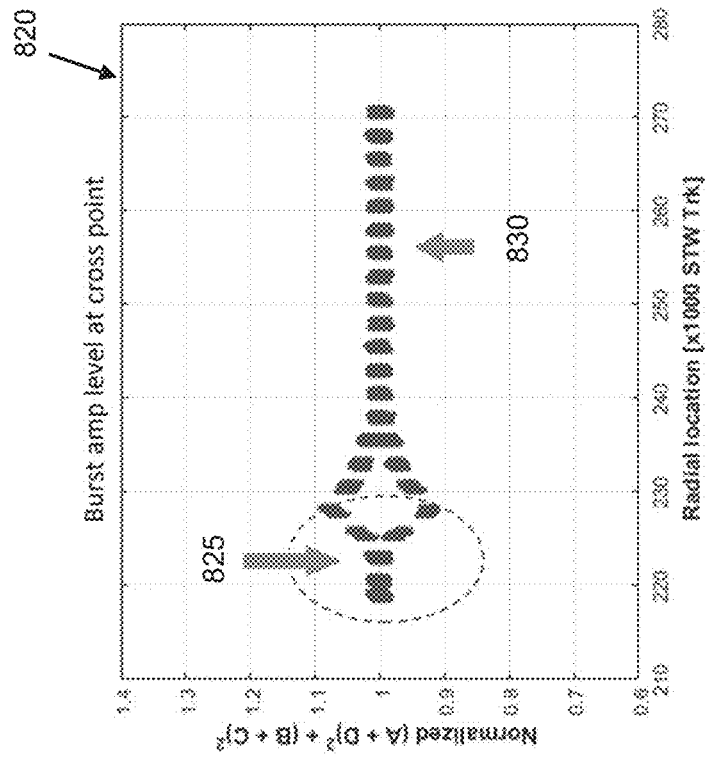
FIG. 8B shows a graph of the measured burst amplitude level at the cross point of the sinusoidal waveforms for the split null burst servo pattern in accordance with aspects of the present disclosure.
Figure 8A:
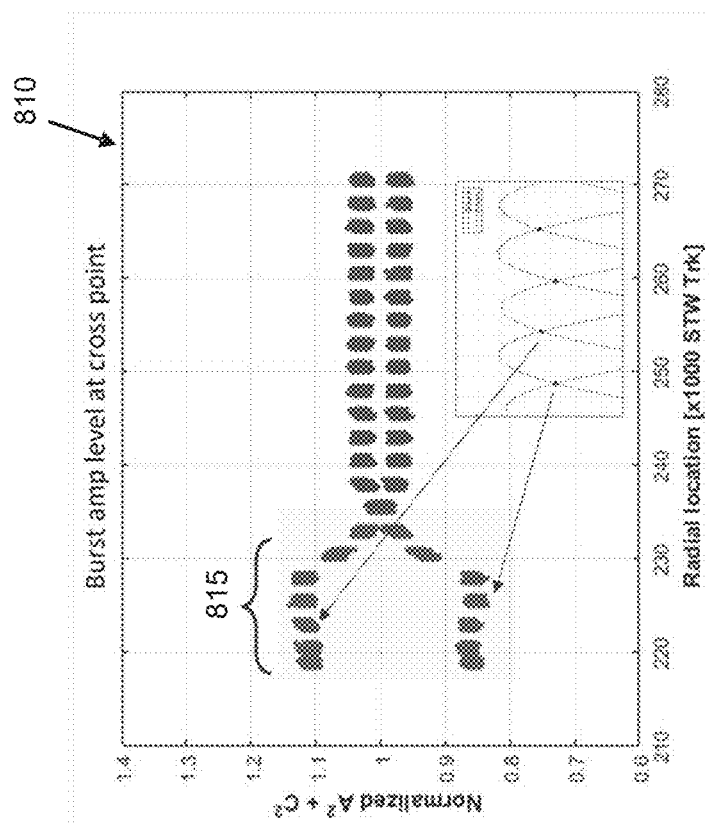
FIG. 8A shows a graph of the measured burst amplitude level at the cross point of the sinusoidal waveforms for a conventional null burst servo pattern.

FIG. 8A shows a graph 810 of the measured burst amplitude level at the cross point of the cross track profiles for a conventional null burst servo pattern consisting of a P burst and a Q burst (e.g., similar to FIG. 4), with normalized combined burst amplitude plotted across radial location. FIG. 8B shows a graph 820 of the measured burst amplitude level, including at the cross point of the cross track profiles for the split null burst servo pattern 510 of FIGS. 5 and 6, with normalized combined burst amplitude plotted across radial location, in accordance with aspects of the present disclosure. The data included in the graphs 810, 820 was measured for the two different demodulation settings on the same servo tracks. Graph 810 shows the burst cross point level shift due to mode hopping at 815. Graph 820 shows the burst cross point level shift is mitigated at 825 and the level split due to write transient canceled at 830.

Figure 9:
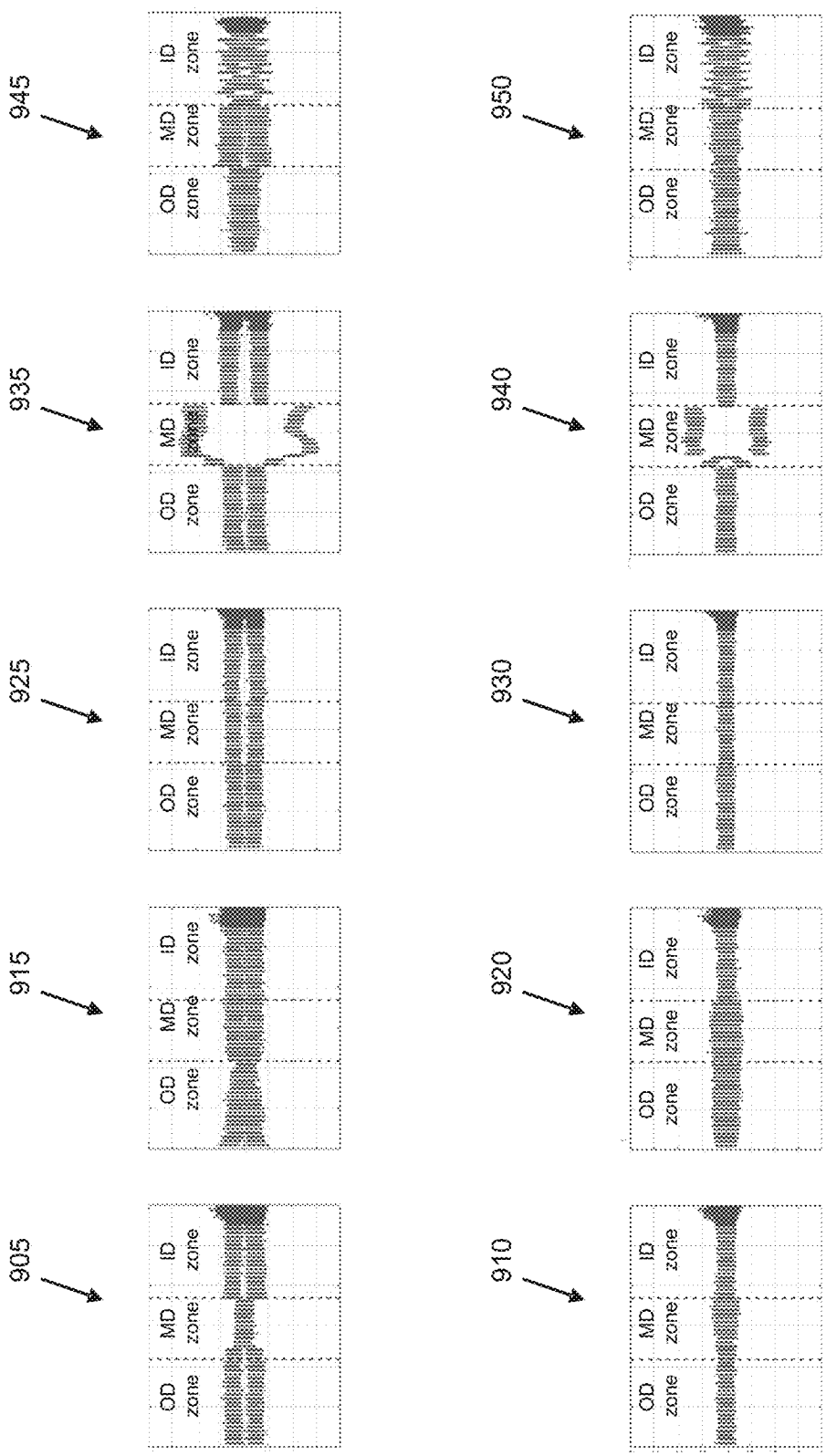
FIG. 9 shows graphs depicting a comparison of amplitude levels of a conventional null burst servo pattern and the split null burst servo pattern in accordance with aspects of the present disclosure.

FIG. 9 shows graphs depicting comparisons of amplitude levels of conventional null burst servo patterns consisting of a P burst and a Q burst (e.g., similar to FIG. 4) and split null burst servo patterns 510 of FIGS. 5 and 6 in accordance with aspects of the present disclosure. Graphs 905, 915, 925, 935, and 945 show levels for five implementations of conventional null burst servo patterns consisting of a P burst and a Q burst (e.g., similar to FIG. 4). Graphs 910, 920, 930, 940, and 950 show levels for five implementations of the split null burst servo pattern 510 of FIGS. 5 and 6 in accordance with aspects of the present disclosure, as read by the same five respective heads as the conventional null burst servo patterns shown in graphs 905, 915, 925, 935, and 945. Graphs 905 and 910 show levels read using a same first head. Graphs 915 and 920 show levels read using a same second head. Graphs 925 and 930 show levels read using a same third head. Graphs 935 and 940 show levels read using a same fourth head. Graphs 945 and 950 show levels read using a same fifth head. The graphs in FIG. 9 demonstrate that using the split null burst servo pattern 510 of FIGS. 5 and 6 in accordance with aspects of the present disclosure reduces the DC bi-modal impact.

Figure 10A:
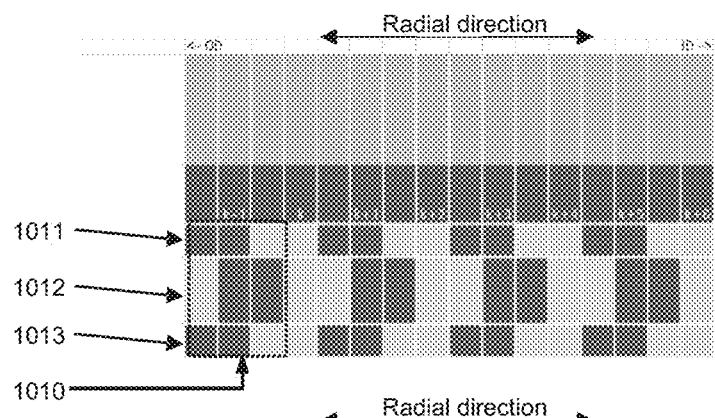
FIGS. 10A-10C show examples of other split null burst servo patterns in accordance with aspects of the present disclosure.
Figure 10B:
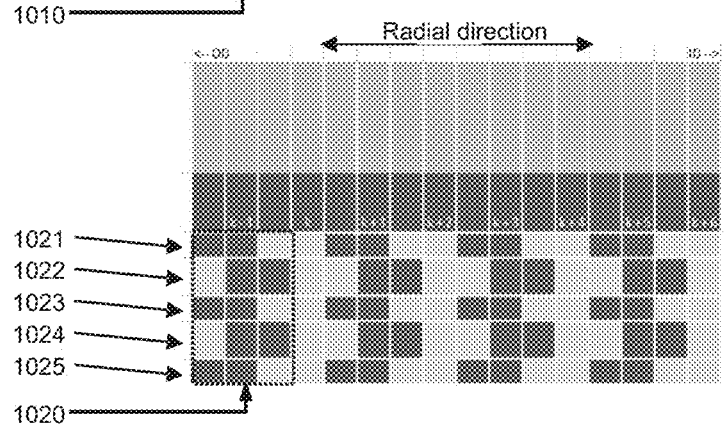
Figure 10C:
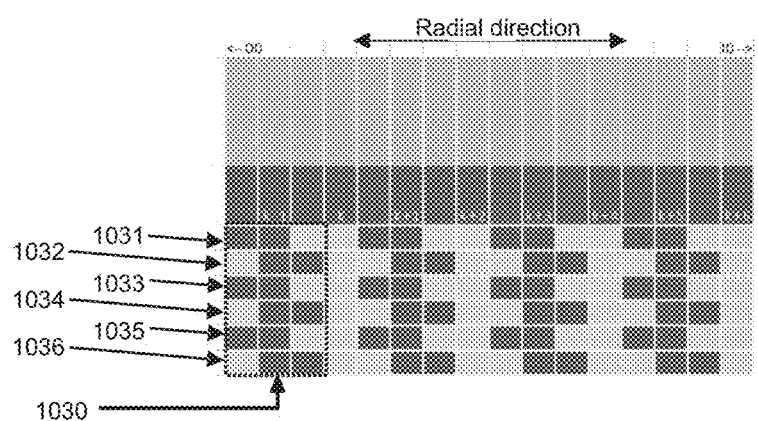

FIGS. 10A-10C shows examples of other split null burst servo patterns in accordance with aspects of the present disclosure, and with polarity configurations between sets of bursts somewhat analogous to that of the example of FIG. 5. Implementations are not limited to the examples described herein, and other split null burst servo patterns may be used.

FIG. 10A shows an embodiment of a split null burst servo pattern 1010 consisting of three bursts: a first set of null bursts comprising a first burst 1011 and a third burst 1013 at a same first radial location and with a first pattern polarity, and a second set of one or more null bursts comprising a single, second burst 1012 at a second radial location and with a second pattern polarity different than the first radial location and the first pattern polarity, thus achieving a polarity configuration between the first and second sets of bursts somewhat analogous to that of the example of FIG. 5. A set of bursts may thus comprise a set of one or more bursts, and may comprise a single burst, as in the set that consists of second burst 1012, in this example. In accordance with aspects of the disclosure, the second burst 1012 is between the first burst 1011 and the third burst 1013 in the longitudinal direction of the track such that the first burst 1011 and the third burst 1013 are spaced apart from one another in this direction. In this example, the down-track symmetric layout helps cancel the write transient. In this example, the second burst 1012 has a different length than each of the first burst 1011 and the third burst 1013 in the longitudinal direction of the track. According to aspects of the present disclosure, in demodulating the split null burst servo pattern 1010, control circuitry 22 may determine an averaged value of the first set of bursts comprising first burst 1011 and third burst 1013 (e.g., of the amplitudes thereof) as a first burst value (e.g., the P burst value), and an averaged value of the second set of bursts comprising only second burst 1012 (e.g., the amplitude thereof) as a second burst value (e.g., the Q burst value). In some examples such as in 10B, control circuitry 22 may thus take the average of a set of one or more values which consists of only a single value, of second burst 1012 in this example, and mathematically, a set may contain only a single value, and the average of the single value will simply be equivalent to the single value. In this manner, control circuitry 22 may use averaged values in determining the P burst and Q burst values to generate a PES based on the determined first, P burst value and the determined second, Q burst value, which may again help to cancel out effects of unpredicted write width changes that may cause distortion of the servo pattern.

FIG. 10B shows an embodiment of a split null burst servo pattern 1020 consisting of five bursts: a first set of null bursts comprising a first burst 1021, third burst 1023, and fifth burst 1025 all at a same first radial location, and a second set of null bursts comprising a second burst 1022 and fourth burst 1024 both at a same second radial location different than the first radial location. In accordance with aspects of the disclosure, the second burst 1022 and the fourth burst 1024 are between the first burst 1021, third burst 1023, and fifth burst 1025 in the longitudinal direction of the track, such that that the first burst 1021, third burst 1023, and fifth burst 1025 are spaced apart from one another in this direction. In this example, the first burst 1021, third burst 1023, and fifth burst 1025 each has a first burst length in the longitudinal direction of the track, and the second burst 1022 and the fourth burst 1024 each has a second burst length in the longitudinal direction of the track, with the second burst length being different than (e.g., longer than) the first burst length.

FIG. 10C shows an embodiment of a split null burst servo pattern 1030 consisting of six bursts: a first set of null bursts comprising a first burst 1031, third burst 1033, and fifth burst 1035 all at a same first radial location, and a second set of null bursts comprising a second burst 1032, fourth burst 1034, and sixth burst 1036 all at a same second radial location different than the first radial location. In accordance with aspects of the disclosure, the odd numbered bursts and the even numbered bursts are arranged or disposed in an alternating manner with one another in the longitudinal direction of the track, such that the respective bursts at the first and second radial locations are spaced apart from one another in this direction. In this example, each of the bursts has a same burst length in the longitudinal direction of the track. In this example, the shorter bursts combination makes the pattern more mode-hop resistant. Thus, in the examples of 10B and 10C also, control circuitry 22 may determine a first averaged value of the first set of one or more bursts, and a second averaged value of the second set of one or more bursts, and generate a PES based on the determined first burst value and the determined second burst value.

Figure 11:
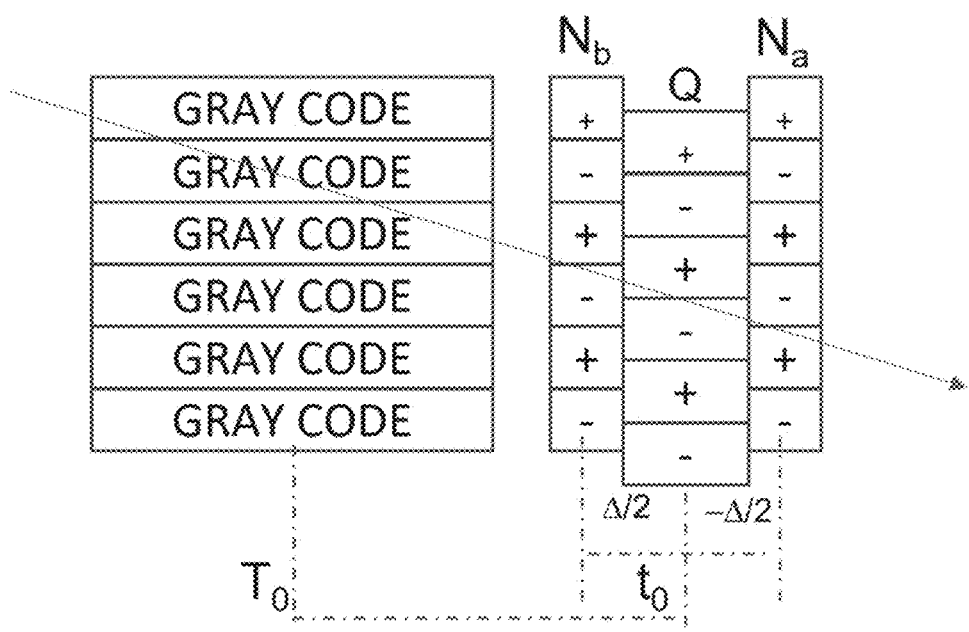
FIG. 11 shows an implementation of burst rotation for seek in accordance with aspects of the present disclosure.

FIG. 11 shows an implementation of burst rotation for seek in accordance with aspects of the present disclosure. FIG. 11 shows servo sectors comprising split null burst servo patterns in accordance with aspects of the present disclosure. FIG. 11 also depicts how the radial velocity of the head varies along these servo sectors. In the example shown in FIG. 11, the split null burst servo patterns correspond to pattern 1010 of FIG. 10A, with bursts $N_b$, Q, and $N_a$ corresponding to bursts 1011, 1012, and 1013, respectively. Control circuitry 22 may implement the following matrix equation for adjusting the amplitudes of the servo burst signals $N_a$ and $N_b$ in response to the radial velocity of the head, relative to the disk surface:

$$\begin{bmatrix} \overline{N_b} \\ \overline{N_a} \end{bmatrix} = \begin{bmatrix} \cos(v\Delta/2) & \sin(-v\Delta/2) \\ -\sin(v\Delta/2) & \cos(-v\Delta/2) \end{bmatrix} \begin{bmatrix} N_b \\ N_a \end{bmatrix} \quad \text{(Equation 1)}$$

in which $N_a$ and $N_b$ are the raw servo burst values, v is the velocity of head 18A, $-\Delta/2$ and $\Delta/2$ are the displacements of the centers of the burst $N_a$ and the burst $N_b$ from the center of the burst Q, and control circuitry 22 may calculate the amplitudes $\overline{N_a}$ and $\overline{N_b}$ of bursts $N_a$ and $N_b$ in accordance with Equation 1. In various embodiments, control circuitry 22 may calculate based on a reference point set to the middle of the Q burst, and rotates $N_b$ and $N_a$, in place of N and Q in a conventional implementation. Using this implementation, control circuitry 22 may determine a new track using the equation:

New TrackID=Raw TrackID+$v$*$(T_0-t_0)$     (Equation 2)

In this implementation, relative to a conventional implementation, N is replaced by $N_b+N_a$, for example, among other novel advantages.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprises logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multiprocessor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
   one or more disks;
   an actuating mechanism comprising one or more heads, and configured to position the one or more heads proximate to disk surfaces of the one or more disks; and
   one or more processing devices, configured to:
      determine a first burst value based on an averaged value of a first set of one or more bursts within a servo pattern;
      determine a second burst value based on an averaged value of a second set of one or more bursts within the servo pattern;
      generate a position error signal (PES) based on the determined first burst value and the determined second burst value; and
      control a position of at least one head among the one or more heads based on the PES,
      wherein at least one of the first set of one or more bursts and the second set of one or more bursts comprises a plurality of spaced apart bursts within the servo pattern, the spacing apart being in a longitudinal direction of a track containing the first and second sets of bursts.

2. The data storage device of claim 1, wherein:
   the first set of one or more bursts comprises a first burst and a third burst each at a first radial location; and
   the second set of one or more bursts comprises a second burst at a second radial location different than the first radial location.

3. The data storage device of claim 2, wherein the second burst is between the first burst and the third burst along the longitudinal direction of the track.

4. The data storage device of claim 1, wherein:
   the first set of one or more bursts comprises a first burst and a fourth burst each at a first radial location; and
   the second set of one or more bursts comprises a second burst and a third burst each at a second radial location different than the first radial location.

5. The data storage device of claim 4, wherein the second burst and the third burst are between the first burst and the fourth burst along the longitudinal direction of the track.

6. The data storage device of claim 4, wherein the second burst and the third burst are written with a radial substantially 90 degree offset relative to the first burst and the fourth burst.

7. The data storage device of claim 1, wherein:
   the first set of one or more bursts comprises a plurality of first bursts each at a first radial location and spaced apart from one another along the longitudinal direction of the track; and
   the second set of one or more bursts comprises a plurality of second bursts each at a second radial location and spaced apart from one another along the longitudinal direction of the track, wherein the second radial location is different than the first radial location.

8. The data storage device of claim 7, wherein respective ones of the plurality of first bursts and respective ones of the plurality of second bursts are disposed in an alternating manner along the longitudinal direction of the track.

9. The data storage device of claim 1, wherein each of the one or more heads includes a laser unit configured to heat the disk surfaces during write operations.

10. The data storage device of claim 1, wherein the one or more processing devices are further configured to adjust amplitudes of the determined first burst value and the determined second burst value in response to a radial velocity of the one or more heads relative to the disk surfaces.

11. The data storage device of claim 1, wherein the first set of one or more bursts and the second set of one or more bursts comprise null bursts, formed by iteratively writing a single frequency pattern with a pattern phase changed 180 degrees at each track of a plurality of tracks.

12. The data storage device of claim 1, wherein the first set of one or more bursts and the second set of one or more bursts comprise quad bursts, which comprise pairs of single-sided bursts formed by writing a single frequency pattern at every other track of a plurality of tracks.

13. A method comprising:
   determining, by one or more processing devices, a first burst value based on an averaged value of a first set of one or more bursts;
   determining, by the one or more processing devices, a second burst value based on an averaged value of a second set of one or more bursts;
   generating, by the one or more processing devices, a position error signal (PES) based on the determined first burst value and the determined second burst value; and
   controlling, by the one or more processing devices, a position of a head of a data storage device based on the PES,
   wherein the first set of one or more bursts and the second set of one or more bursts comprise either null bursts or quad bursts,
   wherein the null bursts are formed by iteratively writing a single frequency pattern with a pattern phase changed 180 degrees at each track of a plurality of tracks, and wherein the quad bursts comprise pairs of single-sided bursts formed by writing a single frequency pattern at every other track of a plurality of tracks.

14. The method of claim 13, wherein:
the first set of one or more bursts comprises a first burst and a fourth burst each at a first radial location;
the second set of one or more bursts comprises a second burst and a third burst each at a second radial location different than the first radial location;
the second burst and the third burst are between the first burst and the fourth burst along a longitudinal direction of a track; and
the second burst and the third burst are written with a radial substantially 90 degree offset relative to the first burst and the fourth burst.

15. The method of claim 13, wherein:
the first set of one or more bursts comprises a plurality of first bursts each at a first radial location and spaced apart from one another along a longitudinal direction of a track;
the second set of one or more bursts comprises a plurality of second bursts each at a second radial location and spaced apart from one another along the longitudinal direction of the track;
the second radial location is different than the first radial location; and
respective ones of the plurality of first bursts and respective ones of the plurality of second bursts are disposed in an alternating manner along the longitudinal direction of the track.

16. One or more processing devices comprising:
means for determining a first burst value based on an averaged value of a first set of one or more bursts;
means for determining a second burst value based on an averaged value of a second set of one or more bursts;
means for generating a position error signal (PES) based on the determined first burst value and the determined second burst value;
means for controlling a position of a head of a disk drive based on the PES; and
means for adjusting amplitudes of the determined first burst value and the determined second burst value in response to a radial velocity of the head relative to a disk surface.

17. The one or more processing devices of claim 16, wherein:
the first set of one or more bursts comprises a first burst and a fourth burst each at a first radial location;
the second set of one or more bursts comprises a second burst and a third burst each at a second radial location different than the first radial location;
the second burst and the third burst are between the first burst and the fourth burst along a longitudinal direction of a track; and
the second burst and the third burst are written with a radial substantially 90 degree offset relative to the first burst and the fourth burst.

18. The data storage device of claim 1, wherein the first set of one or more bursts comprises a first burst and a third at a same first radial location and with a first pattern polarity, and the second set of one or more bursts comprises a second burst at a second radial location and with a second pattern polarity different than the first radial location and the first pattern polarity, and the second burst is disposed between the first burst and the third burst in the longitudinal direction of the track such that the first burst and the third burst are spaced apart from one another in the longitudinal direction of the track.

19. The data storage device of claim 1, wherein the first set of one or more bursts comprises a first burst, a third burst, and a fifth burst all spaced apart from one another at a same first radial location within the servo pattern and having a first burst length in the longitudinal direction of the track,
wherein the second set of one or more bursts comprises a second burst and a fourth burst both at a same second radial location within the servo pattern different than the first radial location, and each having a second burst length in the longitudinal direction of the track, and
wherein the second burst and the fourth burst are disposed between the first burst, the third burst, and the fifth burst in the longitudinal direction of the track, such that that the first burst, the third burst, and the fifth burst are spaced apart from one another in the longitudinal direction of the track.

20. The data storage device of claim 1, wherein the first set of one or more bursts comprises a first burst, a third burst, and a fifth burst all at a same first radial location within the servo pattern,
wherein the second set of one or more bursts comprises a second burst, a fourth burst, and a sixth burst all at a same second radial location within the servo pattern different than the first radial location, and
wherein odd numbered bursts comprising the first burst, the third burst, and the fifth burst and even numbered bursts comprising the second burst, the fourth burst, and the sixth burst are disposed in an alternating manner with one another in the longitudinal direction of the track, such that the respective bursts at the first and second radial locations are spaced apart from one another in the longitudinal direction of the track.

* * * * *